United States Patent
Kapinos et al.

(10) Patent No.: US 12,120,385 B2
(45) Date of Patent: Oct. 15, 2024

(54) METHOD, APPARATUS, AND PROGRAM PRODUCT FOR AUTHORING VIDEO CONTENT USING STREAM EMBEDDED INDICATORS

(71) Applicant: Lenovo (Singapore) Pte. Ltd., New Tech Park (SG)

(72) Inventors: Robert J. Kapinos, Durham, NC (US); Scott Li, Cary, NC (US); Robert James Norton, Jr., Oxford, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/709,843

(22) Filed: Mar. 31, 2022

(65) Prior Publication Data

US 2023/0319347 A1 Oct. 5, 2023

(51) Int. Cl.
*H04N 21/4402* (2011.01)
*H04N 21/81* (2011.01)

(52) U.S. Cl.
CPC ....... *H04N 21/4402* (2013.01); *H04N 21/816* (2013.01)

(58) Field of Classification Search
CPC .......................... H04N 21/4402; H04N 21/816
See application file for complete search history.

(56) References Cited

U.S. PATENT DOCUMENTS

| | | | | |
|---|---|---|---|---|
| 2007/0264003 | A1* | 11/2007 | Voronov | G03B 17/18 396/281 |
| 2008/0198247 | A1* | 8/2008 | Yonaha | H04N 23/611 348/254 |
| 2009/0235141 | A1* | 9/2009 | Shelby | H03M 13/29 714/751 |
| 2014/0267098 | A1* | 9/2014 | Na | G06F 3/041 345/173 |
| 2015/0245050 | A1* | 8/2015 | Tourapis | H04N 9/67 375/240.02 |
| 2019/0266771 | A1* | 8/2019 | Fukushima | G11B 27/329 |
| 2021/0185390 | A1* | 6/2021 | Nishi | G09G 5/14 |
| 2022/0094877 | A1* | 3/2022 | Mandal | H04N 19/85 |

\* cited by examiner

*Primary Examiner* — Yassin Alata
(74) *Attorney, Agent, or Firm* — Kunzler Bean & Adamson

(57) ABSTRACT

Apparatuses, methods, and program products are disclosed for displaying video inputs. One apparatus includes a display, a processor, and a memory that stores code executable by the processor. The code is executable by the processor to receive, by use of the processor, multiple video inputs. The code is executable by the processor to determine display criteria of each video input of the multiple video inputs based on user selection. The code is executable by the processor to display, by use of the display, each video input of the multiple video inputs based on the display criteria of the respective video input.

20 Claims, 8 Drawing Sheets

Original Frame
(with banding)

Embedded Frame

Original Frame
(with banding)

Embedded Frame

FIG. 5

Original Frame
(with banding)

Embedded Frame

Enhanced Frame

METHOD, APPARATUS, AND PROGRAM PRODUCT FOR AUTHORING VIDEO CONTENT USING STREAM EMBEDDED INDICATORS

FIELD

The subject matter disclosed herein relates to editing video content and more particularly relates to authoring video content using stream embedded indicators.

BACKGROUND

Description of the Related Art

Many modern professional video cameras can capture video with high quality wide color gamut and brightness range. The effect at the highest quality may exceed what the human eye can naturally see. Video playback devices, such as desktop computers, laptop computers, tablet computers, smart phones, optical head-mounted display units, smart watches, televisions, streaming devices, etc., are ubiquitous in society and may be used to display different quality levels of video content. Video content may be captured, authored, mixed, processed, or rendered using a widening range of quality parameters (e.g., bit-depths for color or luminance), but for various reasons some viewers still do not experience the full potential of the video content they are viewing. In part, this is due to inferior playback devices, degradation of the original source stream in the encoding process, or they simply don't know that better quality may be attainable on their playback device.

BRIEF SUMMARY

Apparatuses, methods, systems, and program products are disclosed for authoring video content using stream embedded indicators. An apparatus, in one embodiment, includes a video authoring module configured to author a video segment having a first stream with at least one portion correctly authored for a lower quality display and at least one portion incorrectly authored for a lower quality display; and a video processor configured to embed an indicator into the at least one portion incorrectly authored for a lower quality display. In some embodiments, the video processor is further configured to enhance the first stream with a second stream authored for a higher quality display and to correct the at least one portion incorrectly authored for a lower quality display and a video renderer for rendering the enhanced video segment on a higher quality display. In certain embodiments, the video processor is configured to cover the at least one embedded indicator so that the embedded indicator is not visible in the rendered enhanced video segment.

A method, in one embodiment, includes authoring a video segment having a first stream with at least one portion correctly authored for a lower quality display and at least one portion incorrectly authored for a lower quality display and embedding at least one indicator into the at least one portion incorrectly authored for a lower quality display. In some embodiments, the method continues and enhances the first stream with a second stream authored for a higher quality display and corrects the at least one portion incorrectly authored for a lower quality display. In one embodiment, a video renderer renders the enhanced video segment on a higher quality display and the video processor is configured to cover the at least one embedded indicator so that the embedded indicator is not visible in the rendered enhanced video segment.

A program product, in one embodiment, includes computer readable storage medium that stores code executable by a processor. In one embodiment, the code is executable by the processor to assist a user with authoring a video segment having a first stream with at least one portion correctly authored for a lower quality display and at least one portion incorrectly authored for a lower quality display, embed an indicator into the first stream, enhance the first stream with a second stream, correct the portion incorrectly authored for a lower quality display, and render the enhanced video segment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which:

FIG. 5 depicts one example of an embodiment of authoring video content using stream embedded indicators;

DETAILED DESCRIPTION

Figure 1:
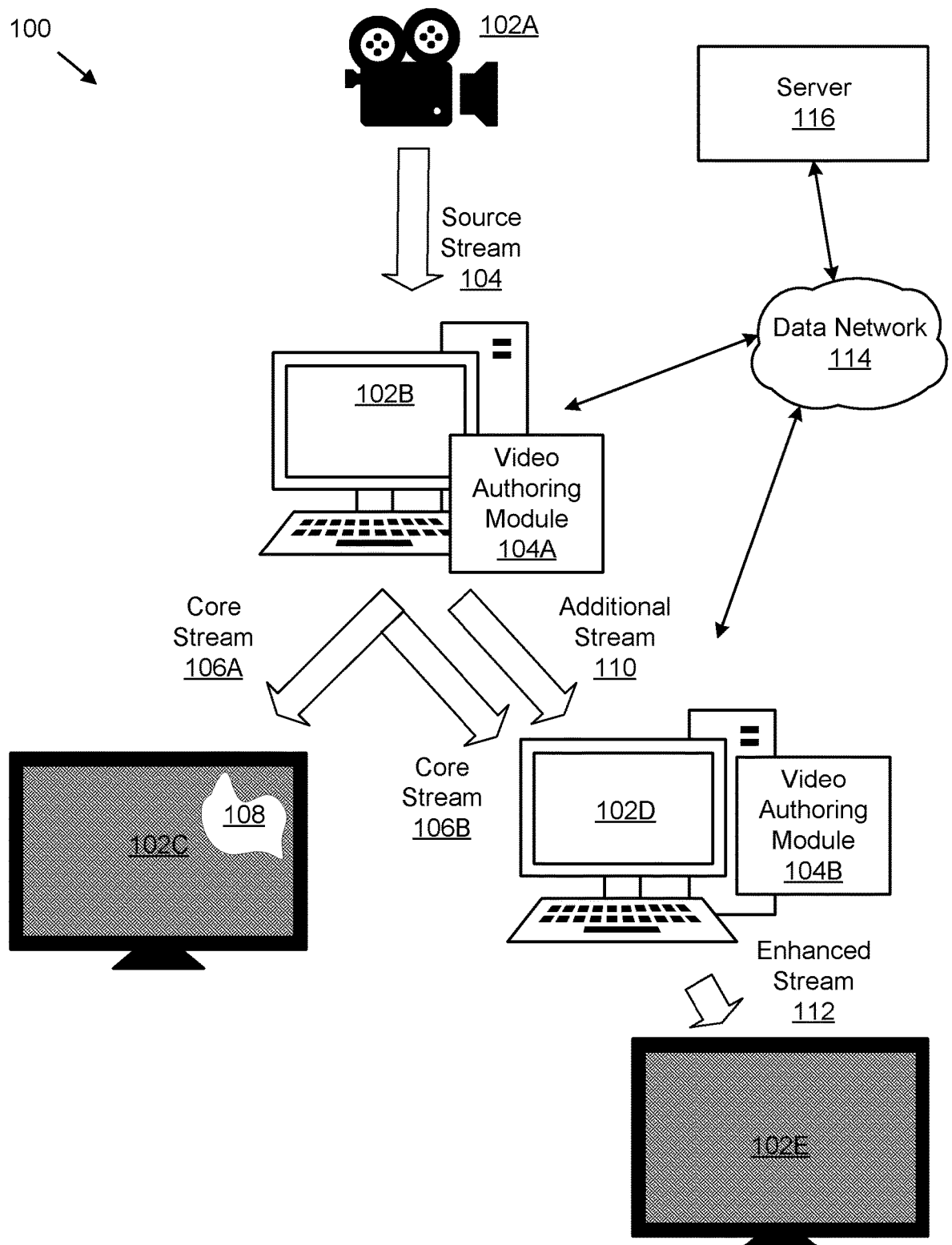
FIG. 1 is a schematic block diagram illustrating one embodiment of a system for authoring video content using stream embedded indicators.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules to emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together but may include disparate instructions stored in different locations which, when joined logically together, include the module and achieve the module's stated purpose.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

As used herein, recitation of an element followed by the phrase "configured to" indicates an actual state of configuration of the element which in various embodiments is determined by programming code, circuitry design, configuration parameters, and so forth. Moreover, the phrase "configured to" as used herein is intended to emphasize that various claimed embodiments cover the element in the corresponding state of configuration whether the element is actively functioning at a particular point in time. For example, an electronic component such as a processor, FPGA, ASIC, that is configured to detect a particular characteristic in data is configured to detect the characteristic in various embodiments by storing software to be executed by the processor, programming the FPGA, designing circuitry for the ASIC, etc. Furthermore, recitation of a particular type of element followed by the phrase "configured to" is intended to be interpreted as it would be understood by a person of skill in the art and is not intended to invoke interpretation as a "means plus function" claim.

The description of elements in each figure may refer to elements of preceding figures. Like numbers refer to like elements in all figures, including alternate embodiments of like elements.

FIG. 1 depicts one embodiment of a system 100 for authoring video content using stream embedded indicators. In one embodiment, the system 100 includes video handling devices 102(A-E), video authoring modules 104(A-B), core streams 106(A-B), additional stream 110 (e.g., metadata stream), and enhanced stream 112, data networks 114, and servers 116. Even though a specific number of video handling devices 102(A-E), video authoring modules 104(A-B), core streams 106(A-B), additional stream 110, and enhanced stream 112, data networks 114, and servers 116 are depicted in FIG. 1, one of skill in the art will recognize that any number of video handling devices 102(A-E), video authoring modules 104(A-B), core streams 106(A-B), additional stream 110, and enhanced stream 112, data networks 114, and servers 116 may be included in the system 100.

In system 100, video handling devices 102(A-E) perform a variety of actions (e.g., capture, store, process, author, transfer, render, and/or display video). Though FIG. 1 focuses on video, audio may be handled in essentially the same manner illustrated here for video. As shown in FIG. 1, one embodiment includes a simplified sequence of video-related events.

Video handling device 102A (e.g., modern film camera) captures video in a pristine source of raw video or "source stream" 104, which comprises high quality video content. Video handling device 102B receives the source stream 104. Video handling device 102B includes video authoring module 104A, which is configured to encode the source stream 104 into a "core stream" 106(A-B) for a particular video handling device, such as a lower quality 8-bit monitor 102C. If a bit pattern made for one electro-optical transfer function (EOTF) is fed into the other EOTF, it looks wrong.

In some embodiments, video authoring module 104A may include a codec for coding and decoding purposes. The core stream 106, in many embodiments, contains bit patterns that can be converted using an EOTF to an image that looks fine to human perception.

In one embodiment, video authoring module 104A encodes the core stream 106(A-B) with an indicator 108, which is a visible artifact upon playback. Video authoring module 104A may encode one or more indicators 108 into one or more locations within the core stream 106(A-B).

At this encoding stage, the authoring module 104A instructs a codec to introduce errors into the core stream 106 and compensating data into the additional stream 110. The authoring module 104A may, for example, implement a stream preparation technique by inducing changes into video frames before sending them to a codec. The authoring module 104A may send the codec unaltered video frames and instruct it to change the encoding parameters for parts of the video segment. The codec may use transcoding by producing a correct core stream 106 and then that core stream 106 gets re-encoded by a special codec that moves information to the additional stream 110 as instructed by the authoring module 104A. The video handling device (e.g., display or monitor shown) 102C has no knowledge of the indicator position and does not use it. The authoring module 104A might also display a preview after preparing an indicator stream. The result is that the core stream 106(A-B) will have improperly authored portions and properly authored portions.

In one embodiment, the video authoring module 104A also decodes and renders core stream 106(A-B) for playback, again for example on a lower quality 8-bit monitor 102C. At this point, a viewer may playback the core stream 106A, but the embedded indicator 108 will be visible. One embodiment uses the comparative math of the different EOTFs to create a core stream 106 that has parts that consistently do not display well through the lower quality EOTF. These parts form the visible indicator 108 in contrast to the properly authored parts of the core stream 106.

In some embodiments, 102C could include its own video authoring module 104 or codec. As part of the indicator 108 embedding process, the codec here functions substantially similarly to the codec described above as part of the video authoring module 104A. The codec would introduce specific errors into the indicator embedded portions that are not included in the properly authored portions.

The additional stream 110, as discussed in more detail below, contains corrective data bits so that the sum of both streams appears correct after the higher quality EOTF is performed. Video handling device 102C does not process this compensation, so the core stream 106A plays back with its visible degraded portions.

Video authoring module 104A, in one embodiment, also provides the indicator-embedded core stream 106B to video handling device 102D. In addition, video authoring module 104A encodes and provides to the video handling device 102D an additional stream 110, which has more data or bit-depth from the source stream and thus is a higher quality video stream (e.g., 10-bit). The additional stream 110 may be used in a higher quality (e.g., high dynamic range (HDR)) video handling device 102. In addition, as mentioned above, the additional stream 110 contains bit pattern, which when added to the core stream 106B enhance or allow the core stream 106B to be converted using a higher quality EOTF to an image that looks better than just the core stream 106 on the other EOTF. In this embodiment, for ease of discussion, video handling device 102B and video authoring module 104A are shown as separate devices from video handling device 102D and video authoring module 104B, but these could be combined into a single device.

In this embodiment, video handling device 102D includes video authoring module 104B, which is configured to enhance and/or correct core stream 106B by combining it with additional stream 110. Some examples of techniques for incorrectly authoring the core stream 106 are discussed above. All techniques are specific to the representative color space and compression routines of the video codec and the raw or source stream 104.

There are also various ways to correct the errors when the core stream 106 and additional stream 110 are added together. Some of these include, for example, data re-composition, error hiding, denormalization, and reconstruction. In data re-composition, in one embodiment, the additional stream 110 contains compensating data for the errors in the core stream 106. Error hiding, in another embodiment, involves masking filtering, and filling holes (e.g., the core stream data 106 is designed to exploit error hiding weaknesses in low quality renderers). Denormalization, in a separate embodiment, uses anti-aliasing, smoothing, etc., (e.g., the core stream data is over normalized knowing that only higher quality renderers can fill in the data gaps. And reconstruction, in one embodiment, fills in the missing data through a prescribed algorithm (e.g., the core stream 106 has the indicator 108 authored using a perceptual model not known to lower quality renderers. Video authoring module 104, in one embodiment, is configured to correct errors introduced into the core stream 106 using one or more of such correction techniques.

As mentioned above, the additional stream 110 contains bit pattern, which when they are added to the core stream 106B allow the core stream 106B to be converted using a higher quality EOTF to an image that looks better than just the core stream 106 on the other EOTF. The additional stream 110 includes compensation or correction data to correct the errors that were introduced as part of the indicator embedding process described herein.

In one embodiment, video authoring module 104B is configured to combine core stream 106B and the additional stream 110 to form an "enhanced stream" 112 and to otherwise correct any errors previously embedded into the core stream 106B. The enhanced stream 112 may then be played back without undesired artifacts or errors in a high-quality format on a high-quality video handling device 102E.

By having both the core stream 106B and additional stream 110 described above, a better result can be achieved over having just the core stream 106A alone. Notably, every digital renderer, such as may be included in video authoring modules 104 herein, may have its own analog component, which converts the bits to visible colors or brightness. These analog components may act differently for different input stream types. Further discussion on this point follows regarding subsequent figures.

The 8-bit and 10-bit examples used herein are for explanation. This could include 10-bit and 12-bit, 12-bit and 16-bit, standard dynamic range (SDR) and HDR, narrow color gamut (NCG) and wide color gamut (WCG) examples or any pair of lower/higher quality renderings. For purposes of the description herein, 8-bit and 10-bit will be used to explain the concepts and embodiments herein.

In one or more embodiments, video handling devices 102 include data capturing devices (e.g., cameras), storage devices (e.g., memories), video processing tools (e.g., video processors, digital renderers, etc.), video displays (e.g., monitors), computing devices (e.g., professional or personal), such as desktop computers, laptop computers, personal digital assistants (PDAs), tablet computers, smart phones, smart televisions, projectors, set-top boxes, game consoles, virtual reality headsets, security systems (including security cameras), vehicle on-board computers, network devices (e.g., routers, switches, modems), streaming devices, or the like.

The processing steps above may be done in accordance with various formats, specifications, and dynamic ranges of different parameters. Such parameters might include luminosity (brightness), chromacity (hue and colorfulness), resolution, compression, frame or bit rate, tone, contrast, etc. The discussion herein will focus on luminosity and chromacity, but similar concepts and principles may apply across many parameters.

Luminosity, for example, dynamically ranges in depth from the darkest to the brightest areas (i.e., absolute black level to peak brightness) of a video segment, image, or frame. Likewise, chromacity ranges in the depth of the colors that can be presented as part of a video segment, image, or frame. As discussed in more detail herein, these parameters can be corrected, adjusted, or enhanced by the techniques and embodiments disclosed herein. Although this document refers to parameters, such as luminosity and chromacity, there are many parameters that can affect the quality of video if authored and implemented correctly.

Each of the video handling devices 102 may house an embodiment of the video authoring module 104 or the video handling device 102 may be coupled to the video authoring module 104. In various embodiments, video handling devices 102, may include more powerful processors to efficiently handle larger volumes of data and avoid latency and similar effects. More powerful processors are more efficient in processing the increased data that is a result of increasing the bit-depth ranges for improved chromacity and luminosity, for example. In some embodiments, the video handling devices 102 include wearable devices, such as smart watches, fitness bands, optical head-mounted displays, or the like. The video handling devices 102 may access the data network 114 directly using a network connection.

In one embodiment, as part of the video handling device 102, viewers may select hardware settings that specify video content quality. Viewers vary in expertise and technology awareness, so this remedy alone could lead to inconsistent or incorrect setting configurations. Moreover, a setting or notification that is off could result from any number of failures and not necessarily that the content displayed is not actually of the higher quality available. Thus, such a solution might also fail to properly notify the user of degraded video quality. To ensure proper notification, the video handling device 102 embeds at least one indicator 108 into the incorrectly authored portion of the video segment as discussed further herein.

The video authoring module 104, in one embodiment, includes pre-programmed software or tools that allow an author (i.e., seasoned video professional, programmer, or a novice layman) to store, detect, compose, organize, mix, edit, convert, or otherwise process video stream data, computer-generated data, signals, or other compatible media. Video authoring modules 104 can vary in complexity and may be part of a larger system (e.g., professional video editing system) or they can be stand-alone devices.

To ensure the highest quality video during video processing, professionals and engineers have access to engineering tools such as colorimeters and signal analyzers to profile and calibrate video playback devices, but these expensive and complex engineering tools are not implemented in most video handling devices 102 and may not concurrently notify viewers of degraded video content. Furthermore, some degradations in video quality are undetected by most viewers and may at times be subtle enough to even escape the professional eye. To ensure proper notification, the video handling device 102 embeds at least one indicator 108 into the incorrectly authored portion of the video segment as discussed further herein.

The data network 114, in one embodiment, includes a digital communication network that transmits digital communications. The data network 114 may include a wireless network, such as a wireless cellular network, a local wireless network, such as a Wi-Fi network, a Bluetooth® network, a near-field communication ("NFC") network, an ad hoc network, and/or the like. The data network 114 may include a WAN, a storage area network ("SAN"), a LAN, an optical fiber network, the internet, or other digital communication network. The data network 114 may include two or more networks. The data network 114 may include one or more servers, routers, switches, and/or other networking equipment. The data network 114 may also include computer readable storage media, such as a hard disk drive, an optical drive, non-volatile memory, RAM, or the like.

The server 116, in one embodiment, provides video content to the video handling devices 102. As used herein, the term "video content" refers to recorded video content, computer generated video content, and combinations thereof. In certain embodiments, the server 116 provides streaming video content to the video handling devices 102 over the data network 114. In other embodiments, the server 116 provides interactive video such as online single player or multiplayer games that in some embodiments includes computer generated graphics. In various embodiments, the server 116 publishes video content on a tangible storage medium either as recorded video content or as instructions that when executed by a video processor, graphics processor, or other similar video processing hardware generates video content.

Figure 2:
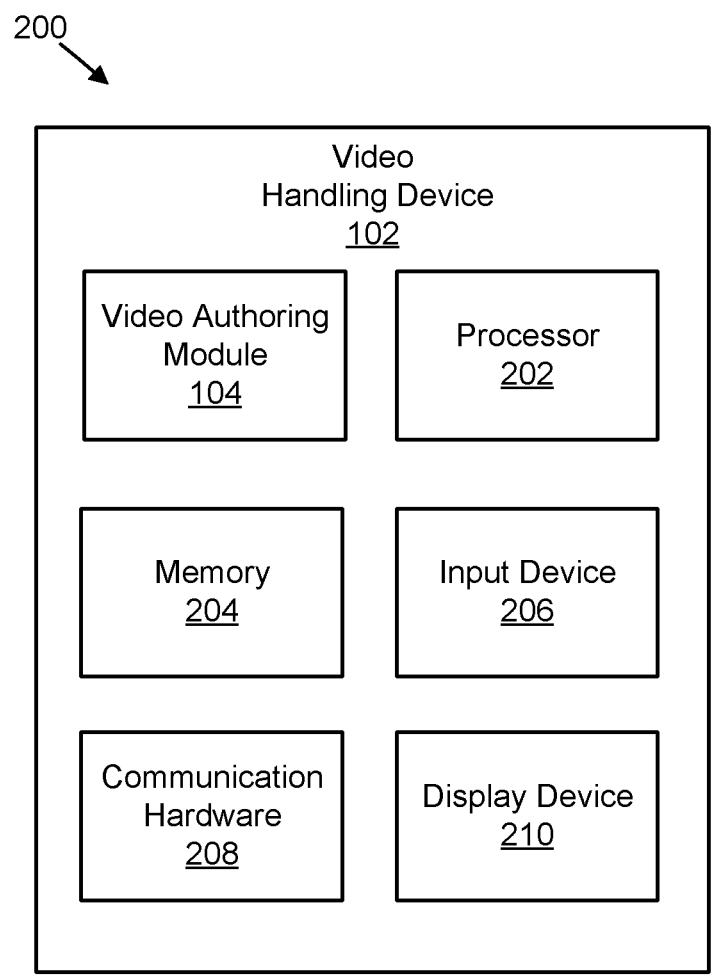
FIG. 2 is a schematic block diagram illustrating one embodiment of an apparatus including a video handling device.

FIG. 2 depicts one embodiment of an apparatus 200 that may be used for authoring video content using stream embedded indicators 108. The apparatus 200 includes one embodiment of the video handling device 102, which includes the video authoring module 104, a processor 202, a memory 204, an input device 206, communication hardware 208, and a display device 210. In some embodiments, the input device 206 and the display device 210 are combined into a single device, such as a touchscreen. Although the apparatus 200 depicts the video handling device 102 is including a specific number of video authoring modules 104, processors 202, memories 204, input devices 206, communication hardware 208, and display devices 210, one of skill in the art will recognize that any number of video authoring modules 104, processors 202, memories 204, input devices 206, communication hardware 208, and display devices 210, may be included in the video handling device 102.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the video authoring module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 may store data regarding the indicators 108. This data may relate to the location or locations of indicator(s) within a core stream 106.

In some embodiments, the memory 204 stores program code and related data, such as an operating system or other controller algorithms operating on the video handling device 102. In some embodiments, during the authoring stage, the memory 204 stores data relating to authoring video content using stream embedded indicators 108. This data may include which portions of the core stream are embedded with indicator data.

The video handling device 102 may use the video authoring module 104, processor 202, or both to notify a viewer of inferior video quality within a portion of video content. As may be appreciated, the video authoring module 104 may include computer hardware, computer software, circuitry, or a combination of computer hardware, software, and circuitry. For example, the video authoring module 104 may include circuitry, or a processor, such as processor 202, to author a video segment that has a first stream with one or more portions that are correctly authored for a lower quality display and one or more portions that are incorrectly authored for a lower quality display. As another example, video authoring module 104 may include a codec or computer program code to embed a notification into incorrectly authored portions of the video segment to indicate inferior video quality in that portion or portions of video content.

The input device 206, in one embodiment, may include any known user interface, such as a computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

In certain embodiments, the input device 206 may be used to input or modify the indicator 108 with text, an image, or other data. In various embodiments, the input device 206 may be used to input viewer customized data. For example, a user may want to customize the indicator 108 to clearly notify a viewer that an incorrect portion of the stream is not playing at its full bit depth. The user could program the phrase "You are viewing in 8-bit mode," which would then display in an area of solid color or within or near some other artifact. Within the video authoring module 104, the viewer may select a fixed time duration that the indicator 108 508 is visible during rendering of the improperly authored portion or portions, or the indicator 108 508 may remain visible for the complete duration that such portion or portions is showing.

The communication hardware 208 may facilitate communication with other devices. For example, the communication hardware 208 may enable communication via Bluetooth®, Wi-Fi, and so forth. In some embodiments, the communication hardware 208 may enable communication with the server 116. In various embodiments, the server 116 provides video content. In some embodiments, the server 116 provides predetermined settings, profiles, guidelines, recommendations, etc., for notification or indicator 108 types, types or titles of video content such as movies, games, clips, advertisements, etc. For example, the server 116 may determine that the video handling device 102 is a previously recognized mobile phone with a certain processing or display capability and in response may cause a different degree of video quality to be rendered than is provided if the video handling device 102 is a big-screen smart television with a different level of compatibility.

The display device 210, in one embodiment, may include any known electronically controllable display or display device. The display device 210 may be part of a video handling device 102 or it can be a standalone device. The display device 210 may be designed according to various formats, specifications, and parameters.

Video playback on the video handling device 102 may be limited as described by the processing sequence discussed above. Such parameters, formats, or specifications may also limit video playback as these are implemented on various video handling devices 102 in the industry. These parameters might be affected in various stages and by various components of the video pipeline, such as described for the system 100, video handling device 102, video authoring module 104, communication hardware 208, display device 210, etc.

Video formats may establish various video parameters. Certain video parameters (e.g., chromacity or luminosity) are commonly measured according to a bit-depth range or gamut. These can include 8-bit ($2^8$=256-bit range), 10-bit ($2^{10}$=1024-bit range), 12-bit ($2^{12}$=4048-bit range), 14-bit, 16-bit, and so on. In an RGB color model with three channels, for example, an 8-bit per channel device would have a range of 256×256×256 bits or around 16.7 million colors. A 10-bit per channel device would be capable of displaying 1024×1024×1024 bits or over a billion colors.

Many modern display devices 210 can display a lower quality standard dynamic range (SDR) formatted video. In some embodiments, SDR may be compatible with an 8-bit bit depth format. In other embodiments, SDR may be compatible with higher quality bit-depths, such as 10-bit.

High dynamic range (HDR), in contrast, is a dynamic range that is higher than a lower range (e.g., SDR). Memory, such as memory 204, typically stores HDR quality video segments in 10-bit, 12-bit, 14-bit, 16-bit, and higher formats. Display devices 210 capable of higher quality, such as HDR displays 210, may play higher bit-depth formats, and may also be backward-compatible to play lower bit-depth formats, such as SDR. A higher quality HDR display device 210 (e.g., 16-bit compatible display) may also be backward compatible to play lower quality HDR content (e.g., 10-bit). HDR may also be referred to as wide dynamic range or expanded or extended dynamic range. Some higher dynamic range formats include, but are not limited to: HDR10, HDR10+, HDR10 Pro, Dolby Vision HDR, and HDR HLG.

HDR support labels that identify a level of compatible viewing quality or the parameters, such as luminance or chromacity, may be found on many modern video handling devices 102. But these may be inadequate to notify the viewer of inferior quality video upon playback. Due to inconsistent guidelines and regulations in the industry or intentional or unintentional mislabeling, such labels may simply mean that the display monitor can accept and display an HDR input but may make no guarantees about the HDR quality. This may result in no better quality than SDR content.

Physical labeling may also mislead the viewer, who may incorrectly assume that all content is automatically displayed at the specified maximum compatible resolution or viewing quality regardless of incorrect authoring or other errors. For example, portions of a video stream may be authored properly in 8-bit format, which should render properly on a marked 8-bit display, but other portions may be incorrectly authored in 8-bit format, so these portions would render with undesired artifacts. The viewer may or may not notice or appreciate the loss of video quality. Attaching physical logos or labels may have their place in marketing but may fall short in notifying a viewer that the displayed video could be viewed in a higher quality format. To ensure proper notification, the video handling device 102 embeds at least one indicator 108 into the incorrectly authored portion of the video segment as discussed further herein.

Codecs may also place an overlay on the screen, but this either obscures the video, or if the overlay only appears at the start or during a pause of the video, then viewers would not know if they were consistently viewing higher quality content throughout the video. The result is that viewers may presume but not be aware that they are not viewing the best bit depth quality available for a particular video on their video playback devices. Again, to ensure proper notification, the video handling device 102 embeds at least one indicator 108 into the incorrectly authored portion of the video segment as discussed further herein.

Like HDR formats relating to luminosity as discussed herein, wide color gamut (WCG) relates to chromacity or the quality of color. WCG can also vary in bit-depth per channel quality. Higher quality bit depths (e.g., 10-bit, 12-bit, 14-bit, etc.) can be used to avoid undesired posterization or banding effects, which are more prominent in 8-bit than 10-bit for example. Accordingly, the embodiments described herein can be applied to enhance WCG content as well.

To render HDR and WCG and higher quality formats, the display device 210 in some embodiments includes a display that supports HDR, WCG, and such higher quality formats and a DisplayPort 1.4 or HDMI 2.0a (or newer) connection. Likewise, the display device 210 may need to be compatible or backward compatible with the minimum desired video content quality. For example, if rendered properly on a compatible video pipeline, an 8-bit video segment should render as desired on a compatible 8-bit or higher (if backward compatible for 8-bit video content) display device 210.

In some embodiments, HDR and HDR10 use metadata to adjust an entire video segment or film. The HDR metadata associated with these formats provides the optimal parameters to the HDR video handling device 102, which sets the parameters for the duration of the segment or film. In HDR10+ and HDR Pro, the HDR metadata provides the optimal parameters to the video handling device 102 on a frame by frame or scene by scene basis. This is particularly useful where adjacent scenes have significantly different luminosity or chromacity parameters. HDR HLG implements more efficient transfer functions and is backward compatible with SDR, so a TV broadcaster can send a single signal to all subscribers, and those with HDR capabilities can obtain the benefits of HDR.

In one embodiment, the video handling device 102 identifies one or more incorrectly authored portions of the video stream and embeds an indicator 108 or indicators 108 into this portion of the video stream. In this embodiment, a viewer would receive a clear notification upon playback of the video stream that such stream contains inferior quality video content. In some embodiments, the video handling device 102 corrects and enhances any incorrectly authored portion or portions of the video stream and renders the enhanced resultant stream for display on a compatible HDR display device 210. In this embodiment, the rendered stream should playback without the incorrectly authored artifacts and without viewing the indicator 108 or indicators 108.

To avoid playback on incompatible display devices, some video may be deliberately encoded in a higher quality bit stream (e.g., 10-bit) that is not backward compatible with lower quality displays (e.g., 8-bit). In this scenario, a viewer attempting to playback the higher quality content on a lower quality display would immediately know of the error, because a playback error will occur, and the screen will not render. HDR content is rarely authored in a non-backward-compatible profile, however.

In some embodiments, the display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting video, images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime) in addition to or in lieu of a visual display upon the identification of an embedded indicator 108 within the rendered video segment.

In some embodiments, the display device 210 includes one or more haptic devices for producing vibrations, motion, or other haptic feedback. For example, the display device 210 may produce haptic feedback upon identifying an embedded indicator 108 within the rendered video segment. In certain embodiments, nonvisual interfaces of the display device 210 such as speakers, haptic feedback, and so forth, provide additional notification to a viewer of the rendered video segment. As discussed herein, during the video authoring process, such indicators 108 may be embedded within the video content to alert the viewer that portions have been improperly authored for rendering on a desired quality display device.

In some embodiments, portions or all of the display device 210 may be integrated or coupled with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the video authoring module 104.

In some embodiments, the video authoring module 104 may include circuitry, or a processor, used to author video content, by use of the processor 202, that includes a properly authored portion and an improperly authored portion. As another example, the video authoring module 104, processor 202, or both may include computer program code that embeds an indicator 108 into a video segment or portion of a video segment to indicate inferior video quality in that specific video segment or portion or area within a frame of video content. As a further example, the video authoring module 104 may include computer program code that combines the properly authored portion with the improperly authored portion and corrects and enhances such portions. As yet a further example, the video authoring module 104 may include computer program code that corrects all portions of code, enhances all portions of code, covers any embedded indicator 108 or indicators 108, and renders the enhanced video content for display on the display device 210. If properly authored, the enhanced video content should render on display device 210 without showing undesired artifacts or the embedded indicator 108 or indicators 108.

In certain embodiments, the video authoring module 104 removes the indicator 108 or indicators 108 once the portions incorrectly authored are corrected. In some embodiments, the indicators 108 are effectively removed by masking, imploring, filtering, or any other image processing technique to reduce their visibility in the pertinent portion of the video stream or segment. In various embodiments, the removed indicators 108 may be replaced by background fill.

Figure 3:
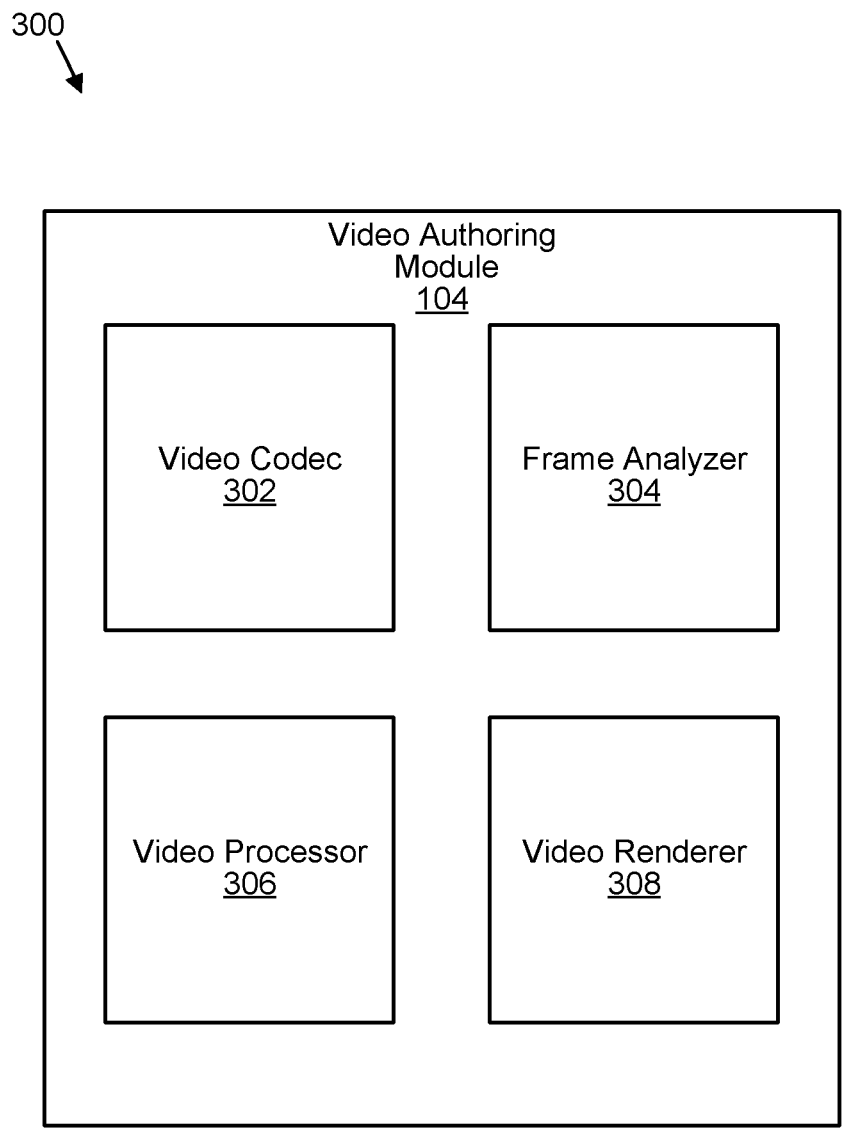
FIG. 3 is a schematic block diagram illustrating one embodiment of an apparatus including a video authoring module.

FIG. 3 depicts a schematic block diagram illustrating one embodiment of an apparatus 300 that includes one embodiment of the video authoring module 104. In certain embodiments, the video authoring module 104 includes a video codec 302, frame analyzer 304, a video processor 306, and a renderer 308. In some embodiments, such as embodiments in which the video authoring module 104 authors, embeds, corrects, enhances, or renders video content that is computer-generated directly rather than compressed and encoded, the video authoring module 104 includes the frame analyzer 304, the video processor 306, and the renderer 308 and does not need to include a video codec 302. Various architectures, modules, and configurations may be used to implement these described embodiments.

In one embodiment, the video codec 302 receives compressed video from a video stream. In certain embodiments the video stream is communicated over the data network 114. In other embodiments, the video stream is decoded from tangible media such as a DVD, a hard disk, flash memory, Blu-ray disc, etc. In some embodiments, the video codec 302 is configured to decode high-efficiency video coding ("HEVC") also known as H.265 and MPEG-H Part 2. In various embodiments, the video codec is implemented using hardware such as an ASIC, FPGA, or dedicated circuitry and in certain embodiments, the video codec 302 uses hardware acceleration from the processor 306, which may include a graphics processor with multiple cores.

In various embodiments, the processor 202 depicted in FIG. 2 includes an integrated video processor 306. In some embodiments, the processor 202 and the video processor 306 are separate processors so that the processor 202 can handle routine processing for the video handling device 102 and the video processor 306 is specially configured to process specialized video, perform graphics processing, perform image analysis, recognize objects, detect edges, and so forth.

In some embodiments, the video processor 306 includes a graphics processing unit ("GPU") that is compatible with HDR, WCG, and higher quality formats. Such GPUs can include, for example, Intel's 7$^{th}$ generation Core line, NVIDIA's GeForce GTX900 series, Apple's M1, and AMD's Radeon RX 400 series. In certain embodiments, the GPU runs at a different clock speed than the processor 202 and includes multiple processing cores with specialized hardware for processing graphics and/or motion video. The video processor 306 in various embodiments includes special memory that provides buffering of multiple frames of video. In other embodiments, the video processor 306 includes a GPU and specialized graphics memory for storing data or metadata to be rendered.

In one embodiment, a video handling device 102 (e.g., video camera) captures HDR quality video and the video authoring module 104 authors or masters the video content. The codec 302 encodes HDR quality content using, for example, a PQ or HLG transfer function. The video authoring module 104 bundles or mixes metadata with the encoded video signal and transmits the HDR quality video segment to a compatible HDR quality display device 210. A compatible smart (i.e., having its own operating system) TV or compatible display can then decode the video and display the content using the metadata instructions. This can include, for example, adjusting the luminosity or brightness levels as well as the chromacity or color range.

In one embodiment, the second video stream is HDR metadata. HDR metadata programming may require additional processing, so some embodiments include more processors or a more powerful processor, additional bandwidth, and data infrastructure. In some embodiments, the video processor 306 corrects a portion that was incorrectly authored for a lower quality display and covers an embedded indicator 108 or multiple embedded indicators 108, so that any or all embedded indicators 108 are not visible in a properly rendered enhanced video segment. In some embodiments, the video processor 306 will also render the enhanced video content. In this manner, the video processor 306 may be used for authoring video content using stream embedded indicators 108 in video streams that have not been properly authored for a desired quality of video.

In certain embodiments, the video processor 306 corrects the indicator 108 or indicators 108. In some embodiments, the indicators 108 are effectively removed by masking, imploring, filtering, or any other image processing technique to reduce their visibility in the pertinent portion of the video stream or segment. In various embodiments, the removed indicators 108 may be replaced by background fill.

In certain embodiments, the video authoring module 104 may be configured to author a video segment that has a first stream with one or more portions that are correctly authored for a lower quality display and one or more portions that are incorrectly authored for a lower quality display. The video processor 306 may be configured to embed at least one indicator 108 into the video content to identify one or more portions that are incorrectly authored for a lower quality display.

For example, FIG. 5 depicts a video frame sequence of a sunset scene 500. As depicted, an original frame sequence 502 illustrates an improperly authored portion of a video segment, which is not enhanced and not corrected. As depicted, lines radiating outwardly from the sun represent undesired banding artifacts 504 as gradient shades or bands of colors of the sky rather than a smooth transition of color changes. This undesired artifact may be due to an inadequate luminosity or chromacity range, for example.

In one embodiment, in recognition that the video segment includes one or more portions improperly authored for a desired quality, the video processor 306 embeds the one or more portions improperly authored with an indicator 508, which in this instance is shown as a text message, "You are viewing in 8-bit mode." The embedded frame sequence 506 illustrates an embedded indicator 108 that unmistakably notifies the viewer that the video segment is not being viewed in its optimal format. Accordingly, the video authoring module 104 improves video rendering technology by notifying the viewer that the video is not rendering in optimal quality. Within the video authoring module 104, the a viewer may select a fixed time duration that the indicator 508 is visible during rendering of the improperly authored portion or portions, or the indicator 108 508 may remain visible for the complete duration that such portion or portions is showing.

Regarding processing of videos to notify the viewer of inferior video quality playback or to correct such inferior quality, in certain embodiments, the video processor 306 may correct the number of colors displayed within a video frame or frame sequence. In various embodiments, the video processor 306 includes a chromacity or color space converter. In some embodiments, the color space converter is implemented using digital signal processing at least partially in hardware such as an FPGA, a dedicated digital signal processor ("DSP"), or similar components. The video processor 306 may also be configured to act as a color space converter using DSP software such as for example is implemented in an NV12 color space converter DSP module also sometimes referred to as an NV12 converter filter. In certain embodiments, the color space receives the adjusted video content as an input and converts the adjusted video content to a device specific color space. In certain embodiments, the color space converter may be used to adjust the video content to enhance and correct the chromacity. The same or similar embodiments may also correct the luminosity of the video segment.

In one embodiment, the video authoring module 104 includes a renderer 308 that is configured to receive the brightness adjusted or color converted video content and renders the corrected and enhanced video segment on a display device such as the display device 212 of the video handling device 102. In various embodiments, the renderer 308 comprises a portion of the video authoring module 104 within the video handling device 102 and the display device 210 may be external to and separate from the video handling device 102. For example, a video handling device 102 such as a set-top box may perform at least a portion of the rendering and may output a video signal to a display device.

In some embodiments, the video authoring device 104 is configured to author, embed, enhance and correct the portions of the video segment and render the enhanced video content to the video handling device 102. In certain embodiments, the video handling device 104 is configured to author a video segment that has a first stream with one or more portions that are correctly authored for a lower quality display and one or more portions that are incorrectly authored for a lower quality display. The video processor 306 may be configured to embed at least one indicator 108 into the video content to identify one or more portions that are incorrectly authored for a lower quality display. In some embodiments, the video processor 306 may also be configured to enhance the first stream with a second or additional stream 110 authored for a higher quality display (e.g., an HDR additional stream 110). HDR metadata contains HDR content and mastering device properties to enable a compatible display device to show the video content in an optimal format (e.g., enhanced chromacity or luminosity ranges). HDR metadata can include static or dynamic metadata. In such embodiments, the video authoring module encodes or mixes the additional stream 110 into the first stream, which encoding or mixing corrects a portion or multiple portions incorrectly authored for a lower quality display and enhances one or more or all of the portions of the first stream to produce an enhanced video stream or segment. In some embodiments, a multiplexer may be used to mix the first and second video streams. The video processor 306 can also be configured to render the enhanced video segment to the video handling device 102. In one embodiment, the video processor 306 can also be configured to show a pre-render view of the enhanced video segment.

Figure 6:
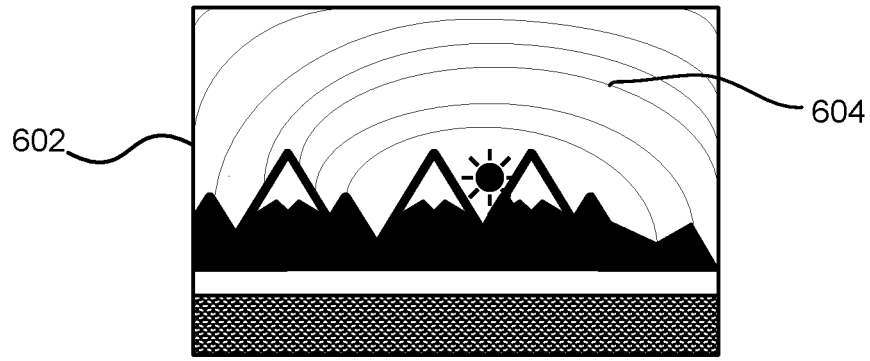
FIG. 6 depicts another example of a different embodiment of authoring video content using stream embedded indicators.
Figure 6:
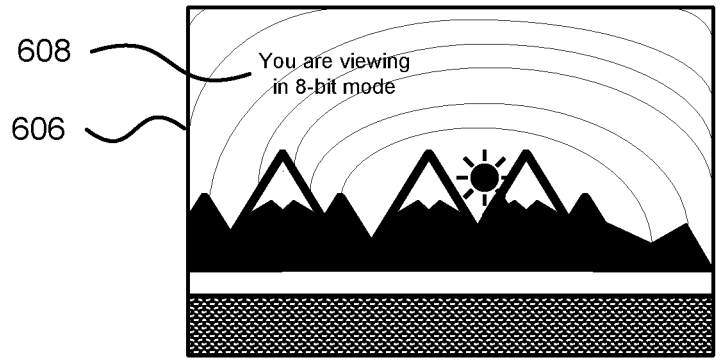
Figure 6:
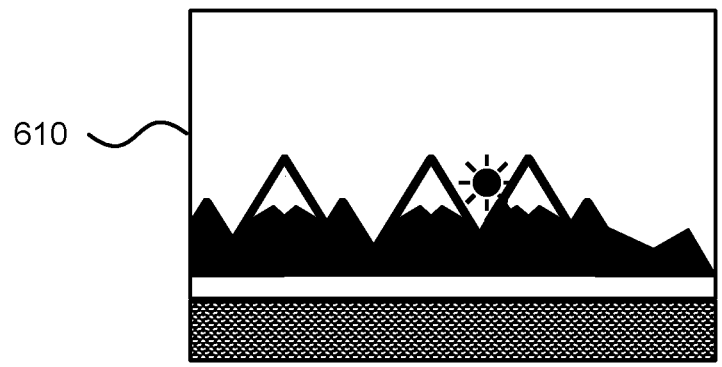

FIG. 6 depicts another example of an embodiment authoring video content using stream embedded indicators 108. FIG. 6 depicts an original frame sequence 600 and an embedded frame sequence 606, which are similarly described in relation to the original frame sequence 500 and the embedded frame sequence 506 in FIG. 5. In this embodiment, the video authoring module 104 enhances and corrects the embedded frame sequence 606. This corrects the authoring errors and enhances the one or more or all of the portions of both the original properly authored and improperly authored portions. In addition, as shown here, video authoring module 104 removes or covers the embedded indicator 108 or indicators 108, so the resulting video segment contains a smoothly transitioning sky color (i.e., removed lines due to banding artifacts) and does not show the embedded indicator 108 or indicators 108 when rendering the video segment on a compatible video handling device 102.

In certain embodiments, the video authoring module 104 removes the indicator 108 or indicators 108 once the portions incorrectly authored are corrected. In some embodiments, the indicators 108 are effectively removed by masking, imploring, filtering, or any other image processing technique to reduce their visibility in the pertinent portion of the video stream or segment. In various embodiments, the removed indicators 108 may be replaced by background fill.

Figure 4:
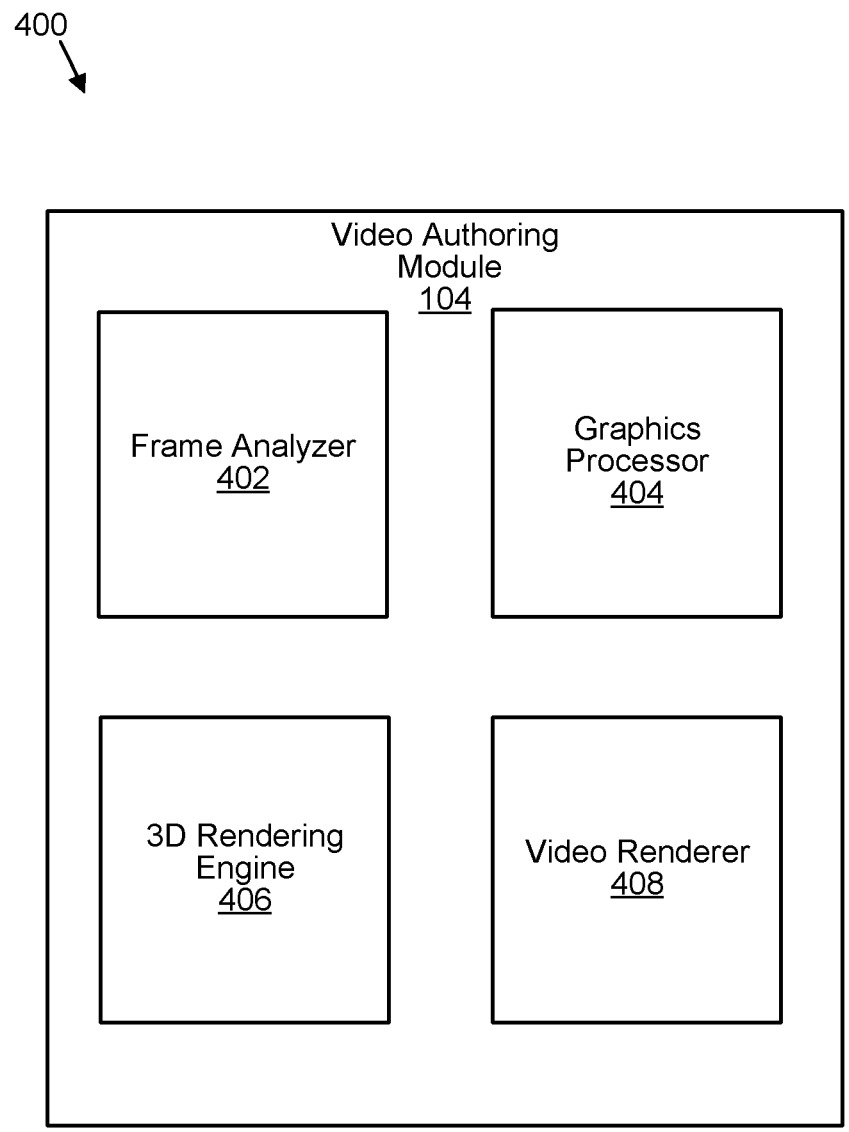
FIG. 4 is a schematic block diagram illustrating another embodiment of an apparatus including a video authoring module.

FIG. 4 is a schematic block diagram illustrating another embodiment of an apparatus 400 that includes one embodiment of the video authoring module 104. In the embodiment, the video authoring module 104 includes one embodiment of a frame analyzer 402, a graphics processor 404, a 3D rendering engine 406, and a video renderer 408.

Accordingly, in one embodiment, the apparatus 400 significantly improves 3D graphics technology by notifying the viewer of portions of incorrectly authored video by embedding one or more indicators 108 within such portions within certain types of computer-generated 3D video such as computer-generated simulations, virtual reality experiences, video games, and so forth. In some embodiments, the apparatus 400 further significantly improves 3D graphics technology by embedding one or more indicators 108 to identify incorrectly authored video portions within certain types of computer-generated 3D video such as computer-generated simulations, virtual reality experiences, video games, and so forth, correcting and enhancing such incorrectly authored video portions, and rendering the resulting enhanced video segment to the video handling device 102. Though the apparatus 400 as depicted in FIG. 4 does not illustrate components that are configured to also adjust moving two-dimensional video frames, a person skilled in the art will recognize that in some embodiments, 3D computer-generated graphics and 2D motion video may be combined and the apparatus 400 may also include configurations described above with respect to the apparatus 300 of FIG. 3.

Figure 7:
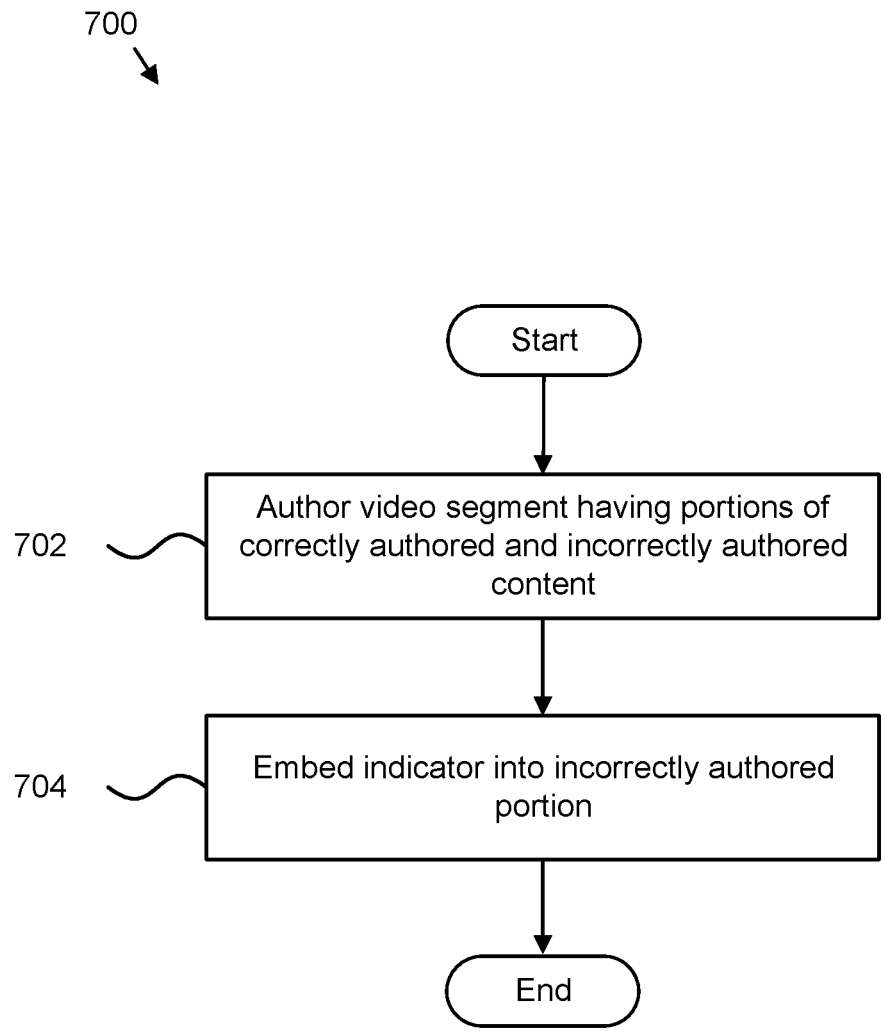
FIG. 7 is a schematic flow chart diagram illustrating an embodiment of a method for authoring video content using stream embedded indicators.

FIG. 7 is a schematic flow chart diagram illustrating an embodiment of a method 700 for authoring video content using stream embedded indicators 108. In some embodiments, the method 700 is performed by an apparatus, such as the video handling device 102. In other embodiments, the method 700 may be performed by a module, such as the video authoring module 104. In certain embodiments, the method 700 may be performed by a processor executing program code, for example, a microcontroller, a microprocessor, a CPU, a GPU, an auxiliary processing unit, a FPGA, or the like.

In one embodiment, the method 700 begins and authors 702, by processor, a video segment that has a first stream with one or more portions correctly authored for a lower quality display and one or more portions incorrectly authored for a lower quality display. The method 700 continues and embeds 704, by processor, one or more indicators 108 into the one or more portions incorrectly authored for a lower quality display.

In some embodiments, processor 306 enhances one or more or all of the portions of the first stream with a second stream authored for a higher quality display and corrects one or more or all of the portions incorrectly authored for a lower quality display. In some embodiments, a video authoring module 104 renders the enhanced video segment on a higher quality display. In certain embodiments, correcting the one or more or all of the portions incorrectly authored for a lower quality display includes covering one or more or all of the embedded indicators 108, so that the embedded indicator 108 or indicators 108 are not visible in the rendered enhanced video segment.

In various embodiments, the lower quality display may be an 8-bit or SDR compatible display. In some embodiments, the lower quality display may be configured to display at least a 10-bit video format. In some embodiments, the second stream authored for a higher quality display may be formatted in at least a 12-bit video format. In various embodiments, the format of the second stream authored for a higher quality display may be one of many higher quality video formats, such as Dolby Vision HDR, HDR10, HDR10+, HDR10 Pro, and HDR HLG formats.

In some embodiments, the video segment comprises computer-generated three-dimensional ("3D") content. In various embodiments, the video handling device 102 for displaying the rendered video segment may include a high quality: desktop computer, laptop computer, personal digital assistant, tablet computer, smart phone, smart television, monitor, projector, set-top box, game console, virtual reality headset, security system, vehicle on-board computer, or streaming device.

In some embodiments, one or more steps of the method 700 are performed by a processor or processors. Furthermore, a computer program product for authoring video content using embedded indicators 108 may include a computer readable storage medium having program instructions embodied there with where the computer program instructions executable by a processor to cause the processor to author a video segment having a first stream with one or more portions correctly authored for a lower quality display and one or more portions incorrectly authored for a lower quality display and to embed one or more indicators 108 into the one or more portions incorrectly authored for a lower quality display.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 8:
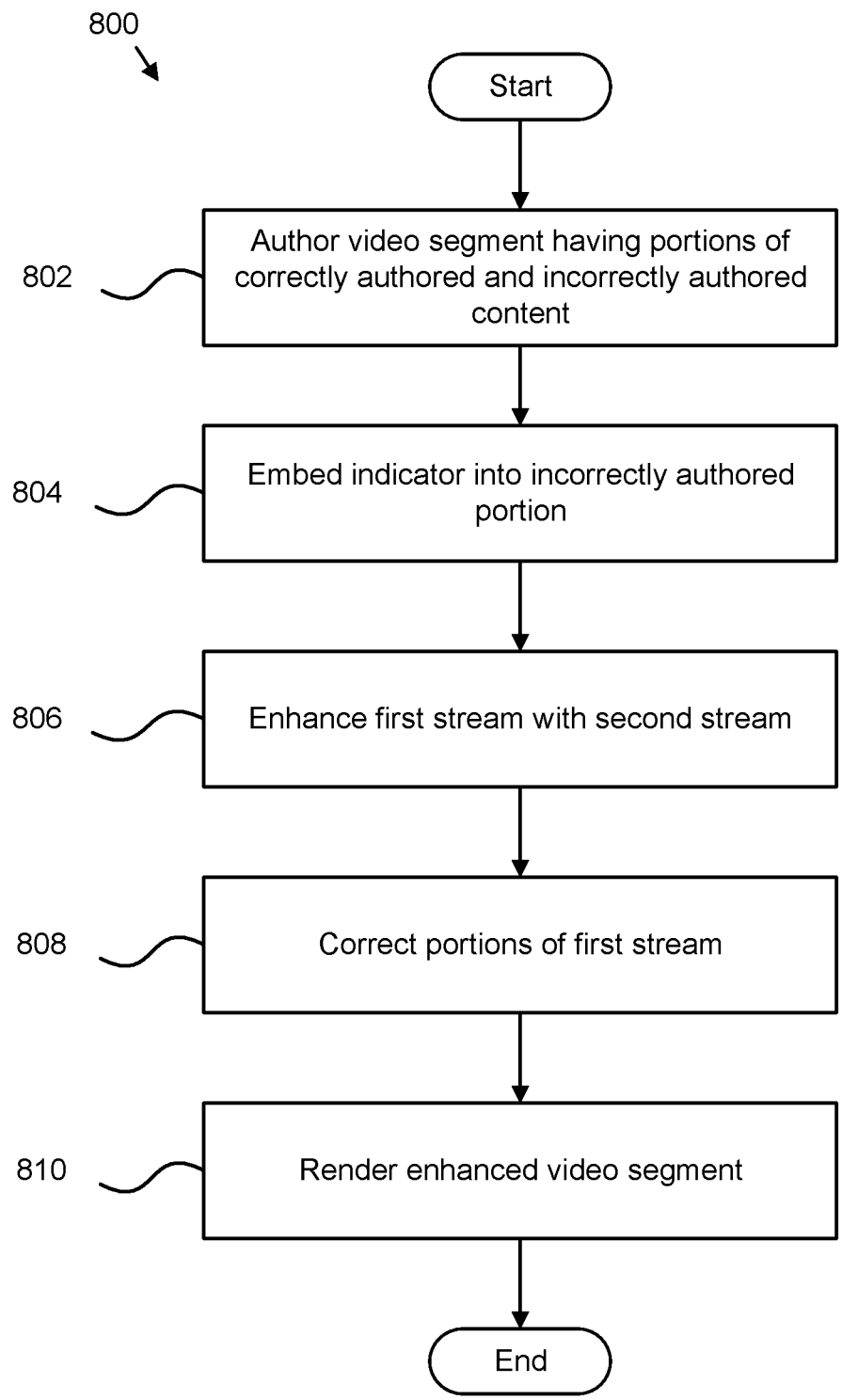
FIG. 8 is a schematic flow chart diagram illustrating another embodiment of a method for authoring video content using stream embedded indicators.

FIG. 8 is a schematic flow chart diagram illustrating an embodiment of a method 800 for authoring video content using stream embedded indicators 108. In some embodiments, the method 800 is performed by an apparatus, such as the video handling device 102. In other embodiments, the method 800 may be performed by a module, such as the video authoring module 104. In certain embodiments, the method 800 may be performed by a processor, such as processor 202 or processor 306, or other module executing program code, for example, a microcontroller, a microprocessor, a CPU, a GPU, an auxiliary processing unit, a FPGA, or the like.

In one embodiment, the method 800 begins and authors 802, by processor, a video segment that has a first stream with one or more portions correctly authored for a lower quality display and one or more portions incorrectly authored for a lower quality display. The method 800 continues and embeds 804, by processor, one or more indicators 108 into the one or more portions incorrectly authored for a lower quality display. The method 800 continues and enhances 806 one or more or all of the portions of the first stream with a second stream authored for a higher quality display and corrects 808 one or more or all of the portions incorrectly authored for a lower quality display. The method 800 continues and renders 810 the enhanced video segment on a higher quality display.

In certain embodiments, correcting the one or more or all of the portions incorrectly authored for a lower quality display includes covering one or more or all of the embedded indicators 108, so that the embedded indicator 108 or indicators 108 are not visible in the rendered enhanced video segment. In one embodiment, rendering 810 the enhanced video segment on a higher quality display includes showing a pre-render view of the enhanced video segment. In several embodiments, the input device 210 includes a user interface to allow customization of the indicator 108 or indicators 108.

In various embodiments, the lower quality display may be an 8-bit or SDR compatible display. In some embodiments, the lower quality display may be configured to display at least a 10-bit video format. In some embodiments, the second stream authored for a higher quality display may be formatted in at least a 12-bit video format. In various embodiments, the format of the second stream authored for a higher quality display may be one of many higher quality video formats, such as Dolby Vision HDR, HDR10, HDR10+, HDR10 Pro, and HDR HLG formats.

In some embodiments, the video segment comprises computer-generated three-dimensional ("3D") content. In various embodiments, the video handling device 102 for displaying the rendered video segment may include a high quality: desktop computer, laptop computer, personal digital assistant, tablet computer, smart phone, smart television, monitor, projector, set-top box, game console, virtual reality headset, security system, vehicle on-board computer, or streaming device.

In some embodiments, one or more steps of the method 800 are performed by a processor or processors. Furthermore, a computer program product for authoring video content using embedded indicators 108 may include a computer readable storage medium having program instructions embodied there with where the computer program instructions executable by a processor to cause the processor to author a video segment having a first stream with one or more portions correctly authored for a lower quality display and one or more portions incorrectly authored for a lower quality display and to embed one or more indicators 108 into the one or more portions incorrectly authored for a lower quality display.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
receiving a video source stream captured by a video handling device;
authoring a video segment of the received video source stream, the video segment having a first stream associated with a first electro-optical transfer function with at least one portion correctly authored for a lower quality display and at least one portion incorrectly authored relative to a first electro-optical transfer function for a lower quality display;
displaying a single frame of the video segment comprising the at least one portion correctly authored and the at least one portion incorrectly authored, wherein the at least one portion incorrectly authored produces undesired visual artifacts due to an inadequate luminosity or chromacity range;
embedding at least one indicator into the at least one portion incorrectly authored within a frame of the video segment, wherein the indicator notifies a viewer that the at least one portion incorrectly authored is not playing at its full bit depth in accordance with the video source stream; and
enhancing the first stream by adding a bit pattern of a second stream to produce an enhanced stream, wherein the enhanced stream is associated with a second electro-optical transfer function having a higher quality than the first electro-optical transfer function, wherein the second stream includes compensating data for correcting errors associated with the first stream.

2. The method of claim 1 further comprising:
rendering the enhanced video segment first stream on a higher quality display to produce a rendered enhanced first stream.

3. The method of claim 2, wherein correcting the at least one portion incorrectly authored for a lower quality display comprises covering the at least one embedded indicator so that the embedded indicator is not visible in the rendered enhanced first stream.

4. The method of claim 2, wherein enhancing the first stream with a second stream authored for a higher quality display comprises correcting multiple portions incorrectly authored for a lower quality display and wherein correcting multiple portions incorrectly authored for a lower quality display comprises covering multiple embedded indicators so that the embedded indicators are not visible in the rendered enhanced video segment.

5. The method of claim 2, wherein enhancing the first stream with a second stream authored for a higher quality display enhances all portions of the first stream.

6. The method of claim 2, wherein the lower quality display is selected from the group of consisting of 8-bit and SDR formats.

7. The method of claim 2, wherein the format of the second stream authored for a higher quality display is selected from the group consisting of high dynamic range, wide color gamut, Dolby Vision HDR, HDR10, HDR10+, HDR10 Pro, and HDR HLG formats.

8. The method of claim 2, wherein the lower quality display is configured to display at least a 10-bit video format.

9. The method of claim 8, wherein the second stream authored for a higher quality display is formatted in at least a 12-bit video format.

10. The method of claim 2, wherein the video segment comprises computer-generated three-dimensional ("3D") content.

11. The method of claim 2, wherein the higher quality display is selected from a group consisting of a desktop computer, a laptop computer, a personal digital assistant, a tablet computer, a smart phone, a smart television, a monitor, a projector, a set-top box, a game console, a virtual reality headset, a security system, a vehicle on-board computer, and a streaming device.

12. An apparatus comprising:
a video handling device configured to generate a video source stream;
a video authoring module configured to author a video segment of the received video source stream, the video segment having a first stream associated with a first electro-optical transfer function with at least one portion correctly authored for a lower quality display and at least one portion incorrectly authored relative to the first electro-optical transfer function for a lower quality display, wherein the at least one portion incorrectly authored produces undesired visual artifacts due to an inadequate luminosity or chromacity range; and
a video processor configured to:
display a single frame of the video segment comprising the at least one portion correctly authored and the at least one portion incorrectly authored;
embed an indicator into the at least one portion incorrectly authored within a frame of the video segment, wherein the indicator notifies a viewer that the at least one portion incorrectly authored is not playing at its full bit depth in accordance with the video source stream; and
enhance the first stream by adding a bit pattern of a second stream to produce an enhanced stream, wherein the enhanced stream is associated with a second electro-optical transfer function having a higher quality than the first electro-optical transfer function, wherein the second stream includes compensating data for correcting errors associated with the first stream.

13. The apparatus of claim 12, wherein the video processor is further configured to correct the at least one portion incorrectly authored for a lower quality display.

14. The apparatus of claim 12, further comprising a video renderer for rendering the enhanced video segment on a higher quality display, wherein the video processor is configured to cover the at least one embedded indicator so that the embedded indicator is not visible in the rendered enhanced video segment.

15. The apparatus of claim 12, wherein the video processor is configured to correct multiple portions incorrectly authored for a lower quality display and configured to cover multiple embedded indicators so that the multiple embedded indicators are not visible in the rendered enhanced video segment.

16. The apparatus of claim 12, wherein the video processor is further configured to show a pre-render view of the enhanced video segment.

17. The apparatus of claim 13, wherein the video processor is configured to enhance all portions of the first stream.

18. The apparatus of claim 12, wherein the video segment comprises computer-generated three-dimensional ("3D") content.

19. The apparatus of claim 12, further comprising a user interface to allow customization of the indicator.

20. A computer program product for enhancing video, the computer program product comprising a non-transitory computer readable storage medium having program instructions embodied therewith, the program instructions executable by a processor to cause the processor to:
receive a video source stream captured by a video handling device;
assist a user with authoring a video segment of the received video source stream, the video segment having a first stream associated with a first electro-optical transfer function with at least one portion correctly authored for a lower quality display and at least one portion incorrectly authored relative to the first electro-optical transfer function for a lower quality display, wherein the at least one portion incorrectly authored produces undesired visual artifacts due to an inadequate luminosity or chromacity range;
display a single frame of the video segment comprising the at least one portion correctly authored and the at least one portion incorrectly authored;
embed an indicator into the first stream within a frame of the video segment, wherein the indicator notifies a viewer that the at least one portion incorrectly authored is not playing at its full bit depth in accordance with the video source stream;
enhance the first stream with a second stream to produce an enhanced stream, wherein the enhanced stream is associated with a second electro-optical transfer function having a higher quality than the first electro-optical transfer function, wherein the second stream includes compensating data for correcting errors associated with the first stream; and
render the enhanced stream.

\* \* \* \* \*